May 28, 1957 J. W. MATTHEWS 2,793,655
FLUSH TANK WATER INLET VALVE
Filed July 15, 1955

J. W. Matthews
INVENTOR

C. A. Snowles
ATTORNEYS.

United States Patent Office 2,793,655
Patented May 28, 1957

2,793,655

FLUSH TANK WATER INLET VALVE

James W. Matthews, Alice, Tex.

Application July 15, 1955, Serial No. 522,279

1 Claim. (Cl. 137—444)

This invention relates to water inlet valves designed for use in water closet flush tanks, an important object of the invention being to provide a valve which will automatically seat in such a way as to insure against the valve leaking under abnormal conditions.

An important object of the invention is to provide a valve having a tapered seat and an elongated tapered floating valve body, controlling the flow of water into the flush tank with which the valve is used, the construction of the valve and seat being such that as it moves over the valve seat, the valve will remove any foreign matter which may collect thereon, and which would hold the valve from its seat, resulting in a leaking valve.

Still another object of the invention is to provide a valve of elongated tapered construction which will automatically adjust itself to its seat, due to wear, thereby insuring a tight, leak-proof valve at all times.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing.

Figure 1:
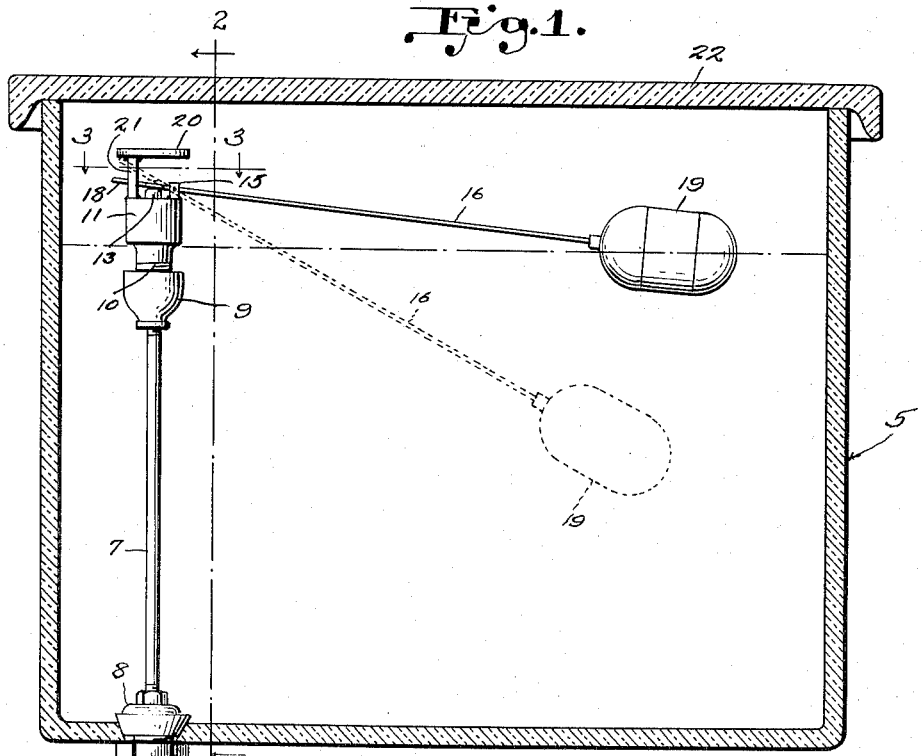
Figure 1 is a sectional view through a water closet flush tank equipped with a valve constructed in accordance with the invention.
Figure 2:
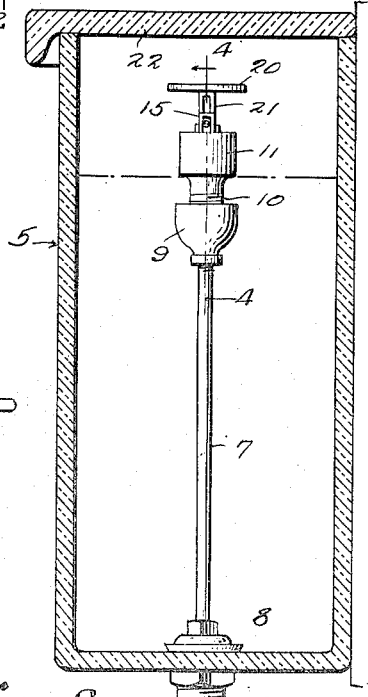
Figure 2 is a sectional view taken on line 2—2 of Figure 1.
Figure 3:
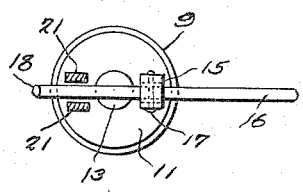
Figure 3 is a sectional view taken on line 3—3 of Figure 1.

Referring to the drawing in detail, the reference character 5 indicates generally a conventional flush tank, with conventional water inlet pipe 6 which communicates with the pipe 7 through the connection 8 secured within an opening in the bottom of the tank 5.

The pipe 7 is formed with a threaded upper end on which the coupling 9 is secured, the coupling 9 being formed with internal threads to receive the threaded end 10 of the valve member 11.

The coupling 9 is formed with a chamber 9' in which water collects in passing to said valve member 11, setting up water pressure at this point.

The valve member 11 is provided with a tapered valve seat 12 in which the elongated floating valve 13 operates, the construction of the floating valve and seat being such that the valve will be wedged-fitted within the valve seat.

Figure 4:
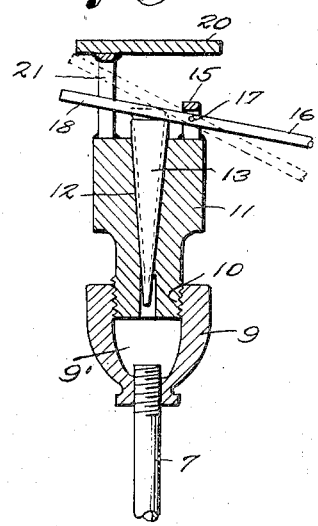
Figure 4 is a vertical enlarged sectional view through the valve seat illustrating a valve as operating therein.

The valve 13 is of a length so that the upper end thereof extends a substantial distance above the upper end of the valve member 11, as better shown by Figure 4 of the drawing.

Rising from the upper end of the valve member 11, is a yoke 15 in which the float rod 16 is pivotally mounted on the pivot pin 17.

This float rod carries its end 18 extended a substantial distance beyond the pivot pin 17, where it rests on the upper end of the floating valve 13, as shown by Figure 4. The other end of said rod is supplied with the usual float 19 that rises and falls with the level of the water within the tank 5.

The reference character 20 indicates a disc which is of a diameter slightly greater than the upper end of the valve member 11, the disc being supported by two arms 21 that rises from the upper end of the valve member 11, and to which the disc 20 is welded. This disc is supported in such spaced relation with respect to the upper end of the valve member, that water entering the tank through the valve member will contact the disc and guard against the water striking the top 22 of the tank, which would be objectionable, and may cause a leak between the top and upper end of the tank 5. Disc 20 also serves to limit the upward travel of the free end of float rod 16 and consequently the downward travel of float 19 thus precluding the accidental jamming of the float or float rod in the event that the water level falls too low. Arms 21 are offset from valve body 9 relative to valve 13 and act as a guide precluding accidental transverse movement of the rod on its pivot member 17.

It might be further stated that it is contemplated to construct the elongated floating valve of rubber material so that a close fit between the valve and its seat will be insured at all times.

From the foregoing, it will be seen that due to the construction shown and described, I have provided a floating elongated valve of a tapered or cone-shaped construction, fitted in a tapered valve seat, which will be seated under normal conditions, by the action of the float and float rod.

It will be seen that as the float 19 descends with the water level in the tank, the end 18 of the rod 16 will move away from the upper end of the floating valve 13 with the result that the water pressure entering the valve member 11 will strike said valve 13 removing it from its seat and exhausting through the valve seat to deposit within the flush tank.

As the float 19 is elevated with the level of the water, it is obvious that the extended end 18 will, due to its contact with the upper end of the valve 13, cause the valve 13 to move downwardly seating within the tapered valve seat and cutting off the flow of water at a predetermined level.

Having thus described the invention, what is claimed is:

A flush tank inlet water valve, comprising a valve body having a tapered bore formed along substantially the entire longitudinal axis thereof, providing a tapered valve seat, a coupling connected between said valve body and the water inlet pipe establishing communication between said valve body and pipe through which water passes to said valve body, an inverted cone shaped valve operating in said valve seat, a flush tank float rod pivotally connected with the valve body, a float on one end of said float rod, the other end of said rod being free of said valve and resting on the upper end thereof, said valve being adapted to move to its open position under the pressure of water entering the valve member against said float, a supporting arm carried by said valve body offset from said valve, a guard disk supported by said arm member in spaced relation therewith against which water impinges on its passage through said valve body, and a second arm spaced from said first mentioned arm, and offset oppositely relative to said valve and carried by said valve body, said spaced arms serving as guides for said float rod, and said guard disk also serving to limit the upward travel of said other end of said rod and hence limit the downward travel of said float.

References Cited in the file of this patent

UNITED STATES PATENTS

| | | |
|---|---|---|
| 943,755 | Morrison | Dec. 21, 1909 |
| 1,323,960 | Burrill | Dec. 2, 1919 |
| 1,368,088 | Wright | Feb. 8, 1921 |
| 2,287,150 | Taylor | June 23, 1942 |
| 2,299,706 | Svirsky | Oct. 20, 1942 |
| 2,731,031 | Newhouse | Jan. 17, 1956 |